Aug. 13, 1946.  C. R. WASEIGE  2,405,623
DRIVING JOINT FOR CONTROL DEVICES FOR
RETRACTABLE MEMBERS ON BOARD AIRCRAFT
Filed May 21, 1942  2 Sheets-Sheet 2
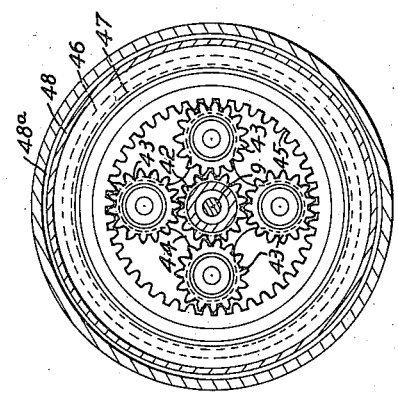
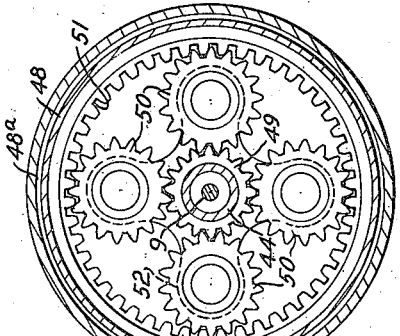
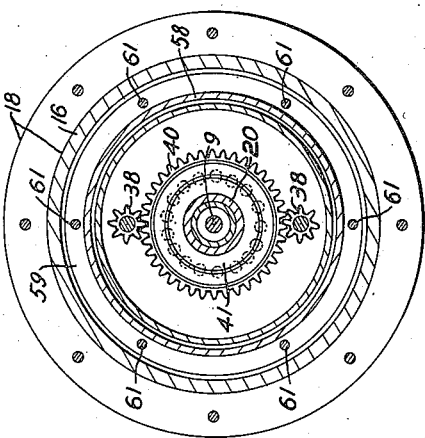
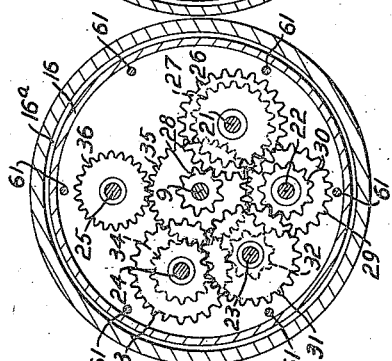
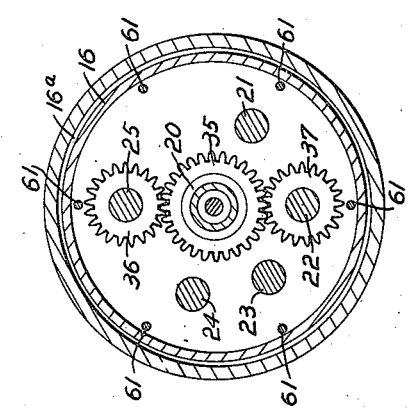
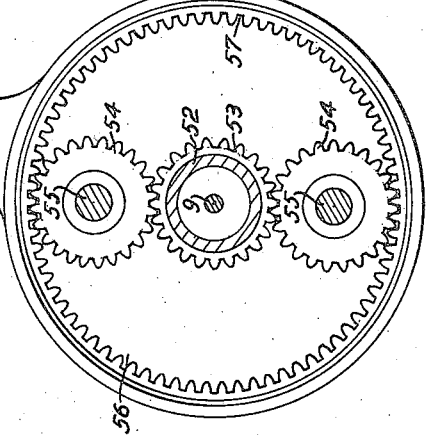
INVENTOR
CHARLES R. WASEIGE
BY
ATTORNEY.

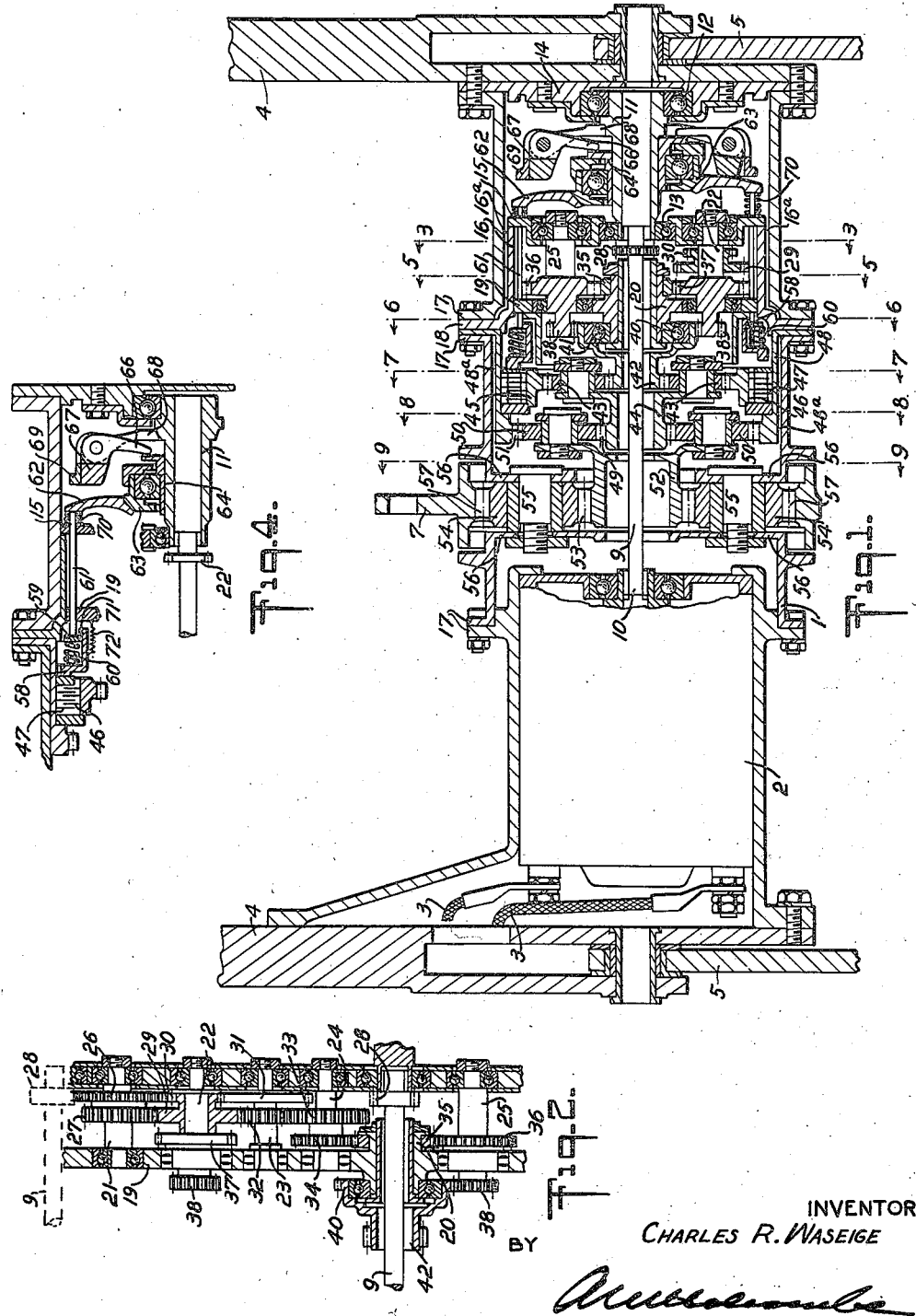

Patented Aug. 13, 1946

2,405,623

UNITED STATES PATENT OFFICE 2,405,623

DRIVING JOINT FOR CONTROL DEVICES FOR RETRACTABLE MEMBERS ON BOARD AIRCRAFT

Charles Raymond Waseige, Saint Etienne, France; vested in the Alien Property Custodian Application May 21, 1942, Serial No. 443,964
In France April 8, 1941

8 Claims. (Cl. 74—305)

In my prior Patent No. 2,148,972, I have described driving joints for control devices for retractable members on board aircraft, which joints consist of two parts pivoted together, one of which forms a case containing an electric motor and a speed reducing gearing transmission, which drives the other part to produce a relative rotation of the two parts.

This invention aims at improving in different respects this kind of joint. More particularly the improvement resides in making the operation thereof easier and more progressive, also safer, of improving its efficiency, of avoiding the wedging of the toothed wheels due to the distortion of the case and of obtaining a more compact construction by a new arrangement of the members when one of the parts is located at the middle of the length of the other.

The various improvements provided in this type of joint in accordance with this invention may be applied together or individually without departing from the spirit of this invention.

One of these improvements consists in that, the speed reducing transmission comprises at least one epicyclic gearing, one of the sun wheels of which turns freely when the motor is not running but is automatically brought to rest when the motor is running. The device provided for thus stopping said sun wheel consists of a progressively acting coupling including plates pressed together by centrifugal weights.

The shocks occurring with the positive couplings such as claw clutches and free wheel devices are thus avoided.

In a convenient embodiment, said stopping coupling is inserted at a point of the transmission where the reduction ratio of the transmission section between the coupling and the second part of the joint, i. e., that differing from the part thereof which forms a case, is sufficiently reduced to prevent said transmission section being substantially irreversible as soon as said coupling is disengaged, while yet being such that the torque to be transmitted by the coupling may have a moderate value, whilst the coupling centrifugal weights are carried by a member rotated at a faster speed than that of the coupling, being for instance directly driven from the motor or even speeded up. Small weights may thus be used, light and of reduced bulk, whilst allowing the joint to be rotated by the action of the load or another external force when the motor is not running and the coupling is disengaged.

Preferably, in accordance with a development of the first improvement, the weights press the plates through the medium of springs, and an abutment limits the centrifugal stroke of said weights. Thus the thrust on the coupling cannot exceed a predetermined limit, whatever the speed of the motor may be. The weights may consequently be so designed as to exert a suitable thrust on the coupling when the motor runs at a speed corresponding to its normal load and, whatever may be the increase of speed due to the motor running with no load or with a reduced load, said pressure on the coupling remains the same, as does also the maximum resisting torque above which slipping of the coupling occurs. Otherwise, the coupling would either slip too easily at low speeds or not sufficiently at high speeds.

Another improvement consists in that the transmission comprises two sections one of which, having a small speed of rotation and a large transmitted torque, including at least one epicyclic gearing, and the other of which, having a greater speed of rotation and a smaller transmitted torque, consists of simple toothed wheels arranged in a circle round the shaft coming from the motor, said wheels forming either a single train driving the epicyclic gearing, or several parallel trains each driving the epicyclic gearing and each driven by a common intermediate pinion connected with the driving pinion through a single intermediate train.

To the advantages of better efficiency, obtained through the use of simple toothed wheels at high speeds of rotation, are thus added the advantages of great reducing ratios and greater compactness of the epicyclic trains whose efficiency at low speeds is satisfactory.

A further improvement consists in that, the motor being located at one end of the case, and the second part of the joint being located at the middle of said case, the driving shaft extends through the case up to the opposite end and the gear transmission is concentrated between that end of the shaft which is removed from the motor and said middle of the joint.

A further improvement consists in that the transmission assembly is supported by sleeves or drums which, due to their being suspended in a second casing disposed within, and in spaced relation to te main casing, are free from flexure distortions of said case.

In order to illustrate how the above improvements may be carried out, the annexed drawings show as an example—to which the invention is however by no means limited—a driven joint in which all these improvements are embodied, said joint comprising besides various other features constituting detail features of the invention.

In these drawings:

Fig. 1 is an axial sectional elevation of the driving joint, the upper half of the figure showing the position of the members when the motor is running and the lower half showing the position thereof when the motor does not run.

Fig. 2 is a developed schematic view showing a plurality of serially arranged reduction gears which are disposed immediately adjacent the motor drive shaft.

Fig. 3 is a sectional view taken along line 3—3 in Fig. 1.

Fig. 4 is an enlarged sectional view of the upper right-hand portion of Fig. 1.

Fig. 5 is a sectional view taken along line 5—5 in Fig. 1.

Fig. 6 is a sectional view taken along line 6—6 in Fig. 1.

Fig. 7 is a sectional view taken along line 7—7 in Fig. 1.

Fig. 8 is a sectional view taken along line 8—8 in Fig. 1.

Fig. 9 is a sectional view taken along line 9—9 in Fig. 1.

In this embodiment, the joint is of the known type comprising an outer case 1 containing at one end an electric motor 2 supplied with current by means of cables 3. To the ends of this case are fastened bars 4 to which other bars 5 are pivoted coaxially with the case 1. Upon a bearing provided on the outside of case 1 is mounted the second part 7 of the joint, which second part is constituted, in this case, by a ring connected with the two bars 5 by a rod, not shown, parallel with the axis of the joint.

In accordance with this invention, a shaft 9 extends axially through the entire length of the case 1. This shaft has a great length and a small diameter so as to be able to yield elastically, more particularly in torsion, and is connected to the motor shaft by a coupling 10, which may either be of the cardan, the elastic or the floating type. Shaft 9 is also connected, at its opposite end, by means of a cardan, a resilient or a floating coupling, to a sleeve 11, which sleeve is supported in two roll bearings 12 and 13, respectively secured to the end bottom 14 of the case 1 and to a cross partition 15, said partition being secured to a large sleeve or drum 16. The case 1 is subdivided transversely into three sections, assembled end to end, by means of flanges 17, and the inner drum 16 itself is secured to said case by means of a flange 18 located between adjacent flanges 17 of adjacent sections. The diameter of this drum is slightly smaller than the inner diameter of the section in which it is located, so that its outer cylindrical periphery does not contact the case, an annular gap 16a being provided therebetween. To the base end of the drum 16 is secured another partition 19 carrying centrally a hub 20 coaxial with the joint. The two partitions 15 and 19 support in ball bearings a set of shafts 21, 22, 23, 24 and 25 arranged in a circle around the axis of the joint (Fig. 3) and carrying spur wheels, viz: the shaft 21 carries two wheels 26, 27 of different diameters, the biggest of which, 26, gears with a pinion wheel 28, keyed to the main shaft 9, and the smallest of which, 27, gears with the largest, 29, of two wheels 29 and 30 keyed to the shaft 22; to the shaft 23 are secured two other toothed wheels 31, 32, the largest of which, 31, engages with the smaller wheel, 30, whilst the smallest, 32, drives a larger wheel, 33, keyed to the shaft 24 to which is also secured a smaller wheel 34; gear wheel 34 drives a pinion 35 which is loosely mounted on the hub 20, said wheel 35 gearing with two wheels 36, 37 oppositely arranged (Fig. 5), the first of which, 36, is keyed to the shaft 25 and the second, 37, rotates freely on the shaft 22. These two wheels 36, 37 are connected with sleeves extending through the partition 19 and carrying on the other side thereof pinion wheels 38 gearing with a common wheel 40 carried by a ball bearing 41 secured to the hub 20 (Fig. 6). Said wheel 40 is fast with another wheel 42 (Fig. 7) which forms the center sun wheel of an epicyclic gearing train comprising several planet pinions 43 carried by a cage 44 and in mesh with the inner set of teeth of an orbit wheel 45. On the outer periphery of said orbit wheel 45 are threaded coupling plates 46 adapted to cooperate with other plates 47 threaded in a drum 48 which is secured to the case 1 in the same way and by similar means as the drum 16. The planets-carrier 44 is fast with gear teeth 49 (Fig. 8) arranged concentrically therewith and forming the sun wheel of another epicyclic gearing comprising planet pinions 50 and a stationary orbit formed by gear teeth 51 of the drum 48, said drum 48 being suspended within outer case 1 and having its outer periphery disposed in spaced relation to the inner periphery of the outer case. This space is designated by reference character 48a. The planet pinions 50 are carried by a cage 52 having a hub provided with gear teeth 53 (Fig. 9) driving two diametrically opposed pinions 54 carried by shafts 55 secured in partitions 56 of the middle section of the case 1 in register with the second part 7 of the joint, said second part being provided with inner gear teeth 57 in gear with pinions 54. It will be noted that the planet pinions of each epicyclic gearing and the corresponding center sun wheel are solely centered by their gear teeth and those of the external orbit which allows a slight tilting of the shafts of the successive gearings.

In order to press the annular coupling plates 46 and 47 together, there is provided a ring-shaped pusher 58 (Figs. 1, 4 and 6) on a skirt portion of which is slidably provided a plate 59 which may be shifted against springs 60, interposed between said pusher and said plate, through the medium of rods 61 extended through the partitions 15 and 19 and guided thereby, said rods being moreover in contact with a plate 62 carried by a spherical joint 63 supported, with interposition of balls, by a ring 64 slidable on the sleeve 11 driven by the shaft 9. This ring 64 is engaged by rocking levers 66 responsive to centrifugal weights 67 carried by a cage 68 fast with the sleeve 11 and the edge 69 of this case provides a stop for limiting the centrifugal stroke of the weights. Springs 70, here shown as surrounding the end of the rods 61, exert on the plate 62 an axial thrust against that which it receives from the weights 67 when the motor runs and whereby it is urged to move to press together the coupling plates 46, 47. A stop 71 (Fig. 4), on the skirt of the plate 58, limits the sliding stroke of the plate 59 so that the springs 60 are always kept energised to some degree. Small springs 72 attached to the plate 58 and to the partition 19 hold the plate 58 out of engagement with the coupling plates when the motor is not running.

The operation is as follows:

At rest, when the motor 2 is not running, the elements of the coupling device are in the position shown in the lower half of Fig. 1. When the motor is started, the torsionally elastic shaft 9 is at once rotated and, through the pinion 28, drives the whole gear train 26 to 42; as the coupling plates are not pressed together, the orbit wheel 45 is free and rotates loosely, driven by the planets which turn loose on their shafts while the planets-carrier 44 remains motionless. At the same time, the shaft 9 causes the sleeve 11 and the weight-carrying cage 68 to rotate; the weights 67 are moved outwards by the centrifugal force acting thereon and cause the spherical thrust ball-bearing 63 and plate 62 to slide. Plate 62 pushes in the rods 61 against the action of the springs 70, and said rods 61 push the plate 58 through the medium of the plate 59 and the already energised springs 60, thereby bringing the plate 58 into contact with the coupling plates against the action of the springs 72 and progressively pressing together the plates 46 and 47. The orbit wheel 45 is thus progressively braked and brought to rest accordingly as the pressure on the plates increases in response to the progressive outward motion of the weights as the speed of the motor 2 increases, which compels the planets-carrier 44 to rotate at a progressively faster rate, and this rotary motion is thus transmitted by the second epicyclic train 49, 50, 51 and the wheels 53, 54 to the second part, 7, of the joint, which part then turns on the case 1.

For a given speed of the motor, the thrust of the rods 61 on the plate 59 exceeds the initial energization of the springs 60, and said plate 59 is slightly shifted on the skirt of plate 58 thereby, further compressing said springs 60. Soon after, the weights impinge against the edge 69 of the cage 68 and, henceforth, the pressure on the plates 46 and 47 remains constant and determined by the rate of compression of the springs 60, whatever may be the increase of speed of the motor. If the resistant torque is abnormally high and exceeds the frictiton torque of said plates under said constant thrust, slipping occurs between said plates relatively to each other and the risk of the gear wheels being broken is thus avoided. When the motor stops, the weights are moved back inwardly and the springs 60, 70 and 72 bring the parts back to their rest position. The provision of the abutment 71 (Fig. 4) enables to limit the total stroke necessary to uncoupling to an amount much lower than that needed for the complete de-energization of the springs 60, and nevertheless to prevent said springs, which remain energized at rest, from exerting then a thrust on the plates 46, 47, this being obtained as soon as the plate 59 attains said abutment 71. The wheel 45 is thus entirely released, which permits the joint to work freely under the action of an external force tending to cause a relative rotation between the two parts of the joint, such as, for example, the weight of a landing gear during the lowering thereof.

What I claim is:

1. A driving joint for operating retractable projecting members on board aircrafts, comprising a unit including a motor, an elongated shaft means for universally connecting one end of said shaft to said motor, a gear fixed upon the other end of said shaft, a speed reducer driven by said gear, said speed reducer occupying a position between said motor and said gear, housing means fast with said motor, and a fixed cantilevered housing disposed within and carried by said housing means, said cantilevered housing having the outer periphery thereof spaced from the inner periphery of the first-named housing, said cantilevered housing also supporting at least a portion of said speed reducer.

2. A driving joint for operating retractable projecting members on board aircraft, comprising a unit including a motor, a speed reducer actuatable thereby, a housing connected to said motor at least one cantilevered sleeve disposed in spaced relation to the inside of said housing, and an annular flange connecting the sleeve to said housing, said sleeve supporting said speed reducer therein.

3. A driving joint for operating retractable projecting members on board aircraft, comprising a unit including a motor, a speed reducer actuatable thereby, a housing connected to said motor and enclosing said speed reducer, fixed cantilevered carrying means disposed within said housing, said carrying means supporting at least a portion of said speed reducer, and a flange for connecting said carrying means to said housing.

4. A driving joint for operating retractable projecting members on board aircrafts, comprising a unit including a motor, a shaft extending from said motor, a planetary speed reducer driven by and disposed intermediate the ends of said shaft, said reducer including a sun gear and a plurality of epicyclic gears intermeshing with the sun gear, housing means fast with said motor for supporting said reducer therein independently of said shaft, said latter means adapted to be operatively connected to one of said members, an annular gear coaxial with said shaft and adapted to be operatively connected to the other end of said members, and a train of gears for drivingly connecting said epicyclic gears with said annular gear whereby the speed reducer is supported coaxially of said shaft by the intermeshing teeth of said gears.

5. A driving joint for operating retractable projecting members on board aircrafts, comprising a unit including a motor, an elongated torsionally yielding shaft universally connected to said motor, a driving means on said shaft, a planetary speed reducer driven by said driving means, said reducer occupying a position between said driving means and said motor and including a central sun gear and a plurality of epicyclic gears intermeshing with the sun gear, housing means fast with said motor for supporting said reducer therein independently of said shaft, said latter means adapted to be operatively connected to one of said members, an annular gear coaxial with said shaft and adapted to be operatively connected to the other of said members, and a train of gears for drivingly connecting said epicyclic gears with said annular gear, whereby the speed reducer is supported coaxially of said shaft by the intermeshing teeth of said gears.

6. A driving joint for operating retractable projecting members on board aircrafts, comprising a unit including a motor, a shaft extending from said motor, a planetary speed reducer driven by and disposed intermediate the ends of said shaft, said reducer including a sun gear and a plurality of epicyclic gears intermeshing with the sun gear, housing means fast with said motor and adapted to be connected to one of said members, a cantilevered housing fixed within said housing means, said cantilevered housing supporting therein said speed reducer independently of said shaft, an annular gear coaxial with said shaft and adapted to be connected to the other of said members, and a train of gears for drivingly connecting said epicyclic gears with said annular gear, whereby the speed reducer is supported coaxially of said shaft by the intermeshing teeth of said gears.

7. A driving joint for operating retractable projecting members on board aircrafts, comprising a unit including a motor, an elongated torsionally yielding shaft extending from said motor, a driving means on said shaft, a planetary speed reducer driven by said driving means, said reducer occupying a position between said driving means and said motor and including a central sun gear and a plurality of epicyclic gears intermeshing with the sun gear, housing means fast with said motor and adapted to be connected to one of said members, a cantilevered housing fixed within said housing means, said cantilevered housing supporting therein at least a portion of said speed reducer independently of said shaft, an annular gear coaxial with said shaft and adapted to be connected to the other of said members, and a train of gears for drivingly connecting said epicyclic gears with said annular gear, whereby the speed reducer is supported coaxially of said shaft by the intermeshing teeth of said gears.

8. A driving joint for operating retractable projecting members on board aircrafts, comprising a unit including a motor, a speed reducer for operating one of said members, a shaft connecting said motor and said speed reducer, housing means fast with said motor for operating the other of said members, and a fixed cantilevered housing disposed within and carried by said housing means, said cantilevered housing having the outer periphery thereof spaced from the inner periphery of the first-named housing, said cantilevered housing also supporting therein at least a portion of said speed reducer, whereby a limited movement of the free end of said cantilevered housing within said first housing will be permitted.

CHARLES RAYMOND WASEIGE.